United States Patent [19]

Erickson

[11] Patent Number: 4,966,014
[45] Date of Patent: Oct. 30, 1990

[54] SOLAR ABSORPTION REFRIGERATION

[76] Inventor: Donald C. Erickson, 1704 S. Harbor La., Annapolis, Md. 21401

[21] Appl. No.: 351,940

[22] Filed: May 15, 1989

[51] Int. Cl.⁵ .............................................. F25B 27/00
[52] U.S. Cl. .................................... 62/235.1; 62/335; 62/476
[58] Field of Search ........................ 62/235.1, 476, 335

[56] References Cited

U.S. PATENT DOCUMENTS

| | | | |
|---|---|---|---|
| 3,817,050 | 6/1974 | Alexander et al. | 62/476 X |
| 4,448,040 | 5/1984 | Kunugi | 62/335 X |
| 4,458,499 | 7/1984 | Grossman | 62/476 X |
| 4,667,485 | 5/1987 | Ball et al. | 62/335 X |
| 4,732,008 | 3/1988 | DeVault | 62/476 X |
| 4,744,224 | 5/1988 | Erickson | 62/235.1 |

Primary Examiner—Lloyd L. King

[57] ABSTRACT

This invention relates to ice-producing refrigerators which operate on an intermittent absorption cycle, and to solar heat collectors suitable for powering the intermittent absorption refrigerators. The refrigerators are useful for making ice and for storing vaccines and food in areas where electricity is unavailable, unreliable, or high in cost.

9 Claims, 2 Drawing Sheets

SOLAR ABSORPTION REFRIGERATION

BACKGROUND

The current practice of solar-powered intermittent absorption refrigeration is exemplified in U.S. Pat. No. 4,744,224. This technology is simple, robust, and reliable. It meets the needs of lesser developed countries by being locally manufacturable and by producing ice at about one-tenth the cost of production by photovoltaic refrigerators, for ice capacity in the range of 10 to 1000 kg per sunny day.

Nevertheless, there still remain two limitations in the current practice of solar absorption refrigeration which have limited its spread. As with all solar technologies, high first cost is a problem. Any measures which would either increase the solar aperture or increase the overall collection efficiency without increasing cost would have the beneficial effect of lowering the first cost per unit of ice produced.

Secondly, the inherent functioning of solar intermittent absorption refergerators is to produce ice at night, which requires evaporator temperatures on the order of $-10°$ C., and then use stored ice by day to keep the cold box at slightly above $0°$ C. In other words, the evaporator region inherently cycles between about $-12°$ C. and about $+4°$ C., depending on insolation and insulation. Clearly it would be possible to incorporate a separate thermostatted compartment cooled by storage ice which maintains a relatively constant $+4°$ C., and that would be useful for many refrigeration applications. However, there is another category of applications which require a relatively constant $-20°$ C. This is the temperature of the frozen food section of most domestic refrigerators, i.e., the "freezer compartment." Examples of commodities which require this level of refrigeration for long term storage include oral polio vaccine, measles, and yellow fever vaccines. Although conventional intermittent absorption cycles could easily be adjusted to yield $-20°$ C. at night, at some loss in efficiency, they have no practicable mechanism for maintaining that temperature by day.

Multiple-staged absorption cycles are well-known in the art, especially for continuous cycles. See for example U.S. Pat. Nos. 4,402,795 and 4,475,361. Some previous work has also been done on intermittent cycles with multiple stages, for example the technical article by A. Mani and A. Venkatesh appearing at p. 271 of Vol. 26 No. 3/4 1986 *Energy Conversion and Management*, entitled "A Two Stage Intermittent Solar Refrigeration System—Evaluation of Salient Parameters". In that article, a two-stage generator and absorber configuration is disclosed which enables use of much lower heat source temperatures (approximately 70° C.), albeit at much lower Coefficient of Performance.

The capital cost problems relating to aperture size and collection efficiency stem from two constraints. First is the sidereal motion. The elevation angle of the sun at solar noon changes by 46.5° through the course of the year. At three hours either side of solar noon, the change is about 5820 . Secondly, the inherent functioning of the intermittent absorption refrigeration cycle requires average temperatures on the order of 50° C. above ambient, and afternoon peak temperatures some 15° C. higher. The collection efficiency of flat plate collectors is simply too low at those temperatures.

It is known that as the collection temperature increases, a concentrating collector (solar aperture larger than solar target) becomes more efficient than a flat plate collector. The decreased loss due to heat leakage from the smaller target offsets the increased loss due to reflections. In the technical article "Low Concentration CPC's for Low-Temperature Solar Energy Applications", February 1986, *Journal of Solar Energy Engineering*, Vol. 108 p. 49, J. M. Gordon shows that a truncated CPC with acceptance half angle of 30° becomes more efficient than a flat plate collector at 21K above ambient for a concentration ratio (CR) of 1, and at 36K for a CR of 1.5.

Clearly at the temperatures required for solar absorption refrigeration some degree of concentration is appropriate. However, just as clearly the cost and reliability constraints eliminate any use of automatic tracking concentrators.

Winston (U.S. Pat. No. 4,002,499) has shown that with a full CPC geometry the concentration ratio achievable from a stationary collector is $1/\sin \theta$, where $\theta$ is the acceptance half angle. Unfortunately the full CPC geometry is very wasteful of reflective material—much of it is shaded for much of the year. When the CPC is truncated to avoid shading, the CR attainable at a given acceptance half angle is much lower. If the aperture of a truncated CPC is increased to get more CR, the acceptance angle decreases, thus either missing some sun or requiring tracking.

It is known to increase the solar aperture by adding one or more hinged reflectors to an array, where the hinges are seasonally adjusted. For example, U.S. Pat. No. 4,371,623 discloses addition of hinged flat plate reflectors to a flat plate collector.

What is needed, and one object of this invention, is a solar energy collector which achieves the advantages of a stationary truncated CPC collector without the attendant disadvantage of low CR. Preferably any required seasonal repositioning of such a device would readily be accomplished by one person. Also desirable objectives are that the same geometry be applicable at different latitudes, and that the collector be acceptably storm-resistant.

A second needed improvement, and object of this invention, is a simple add-on to a solar intermittent absorption refrigerator which would allow maintenance of continuous $-20°$ C. temperature, preferably without requiring an additional generator.

DISCLOSURE OF INVENTION

Two separate inventions are disclosed herein, each having potentially beneficial use independently, but the combination of the two cooperating to provide a uniquely advantageous result in solar refrigeration.

The first invention comprises an elongated arcuate stationary reflector which is mounted along an east-west axis, and which has two hinged arcuate extension reflectors, with the hinge axes being parallel to the stationary reflector axis. A stationary solar target is mounted within the reflection beam of the stationary reflector, and the acceptance half angle of the stationary reflector and target is about 29°. The hinged reflector extensions are capable of being opened until their acceptance half angle is between 10 and 152°, i.e., they can be rotated approximately 45° beyond their position in a fixed CPC geometry with $\theta$ of 29°. They are fitted with adjustable stops to allow seasonal repositioning.

Preferably the glazing is stationary and is attached only to the stationary reflector. Preferably the reflector extensions are approximately the same width as the stationary reflector. Preferably the reflector extensions can be folded together so as to envelop the stationary reflector and glazing, thereby protecting them from severe weather.

The second invention comprises adding a second evaporator and absorber to the conventional intermittent absorption cycle in the following cooperative manner:

(a) the second absorber is cooled by storage ice made by the primary evaporator;
(b) the second evaporator cools a freezer compartment to about −20° C.;
(c) the vapor from the second evaporator is absorbed in the second absorber; and
(d) the second absorber is periodically refilled with absorbent solution from the primary generator/absorber.

Preferably a separate reservoir containing a supply of liquid ammonia for the second evaporator is also incorporated. Preferably the second absorber is filled by gravity transfer from a separate charge tank. Preferably the second absorber is emptied by gravity transfer to a separate discharge tank, which in turn is emptied by pressure transfer back to the primary generator/absorber.

BEST MODE FOR CARRYING OUT THE INVENTION

Figure 1:
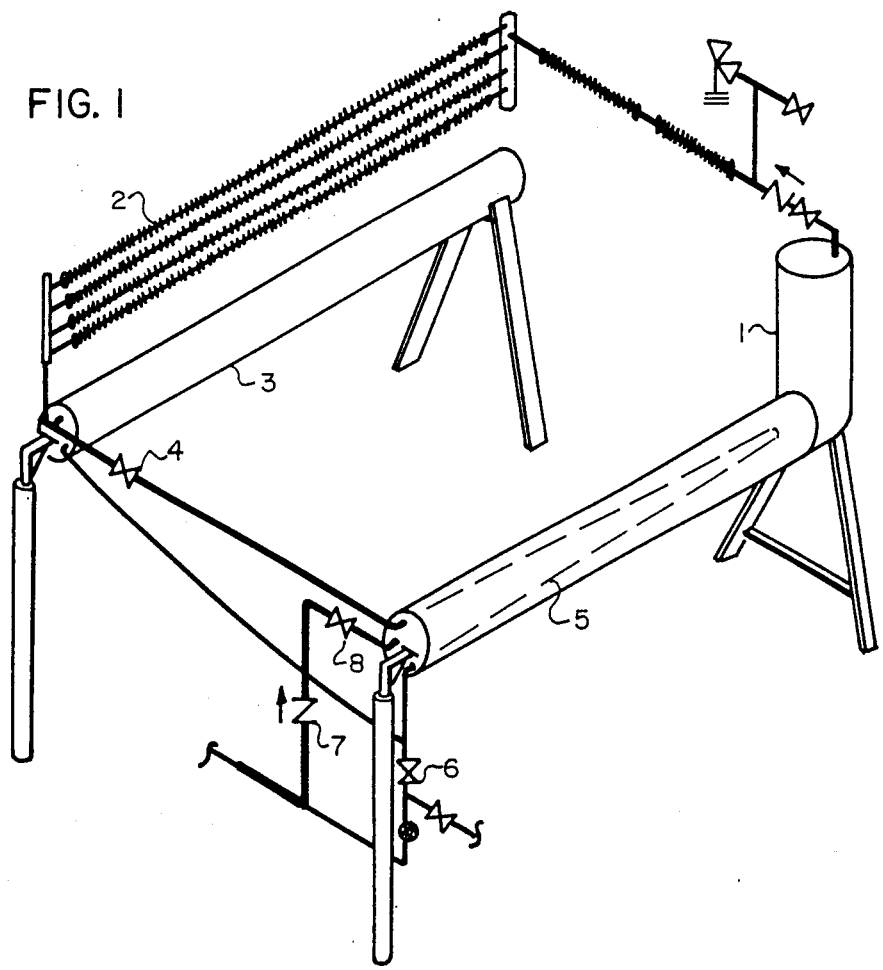
FIG. 1 illustrates schematically one preferred layout for the major components of a conventional intermittent solar ammonia absorption cycle (ISAAC) refrigerator, less the solar reflector, the thermal wall, and the evaporator/cold box.

Referring to FIG. 1, the generator/absorber 1 is comprised of a horizontal section and preferably also a vertical section. Heat applied to the generator causes refrigerant vapor to desorb and exit the top, for routing to the condenser 2, where it is condensed by ambient cooling. Liquid refrigerant collects in receiver 3. At the end of the heat addition, valve 4 is opened to allow liquid refrigerant to flow from thermosyphon 5 thereby cooling the generator/absorber 1, and causing the absorbent pressure to decrease. When the pressure is low enough to produce the desired refrigeration temperature, liquid refrigerant flows through valve 6 to an evaporator in a cold box (not shown in FIG. 1), and the evaporated refrigerant flows via valves 7 and 8 back to the absorber.

Figure 2:
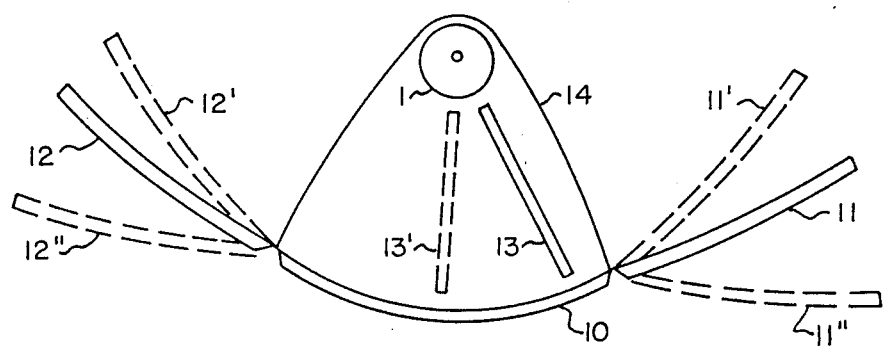
FIG. 2 is a cross section of the hinged solar reflector, illustrating the positions of the hinged sections at different seasons of the year and the position of the vertically oriented thermal wall at two different latitudes.

FIG. 2 illustrates one needed improvement to the basic ISAAC cycle of FIG. 1. The ice-making capacity of this cycle is between 5 and 8 kg per m² of solar aperture. Hence when the icemaker has substantial capacity, e.g., 20 kg or more, the solar reflector necessary to heat it is quite large and heavy. As described earlier, if the reflector is entirely stationary, its concentration ratio is too low and it suffers seasonal losses. On the other hand, if the entire reflector were designed for seasonal repositioning, the mounting system would be much more complex and the weight being moved would require more than one person. FIG. 2 is the solution to these problems. A fixed central arcuate reflector 10 is mounted with its axis of elongation parallel to the axis the horizontal section of generator/absorber 1. Both axes are preferably oriented east-west. Arcuate reflectors 11 and 12 are hinged to the outer edges of stationary reflector 10, with the hinge axes also directed east-west. The solar absorption target area may be increased by mounting a thermal wall (flat plate collector) 13 which is in fluid communication with the absorbent in generator 1 and in close proximity to said generator 1. Preferably it is vertically mounted directly below the generator, such that solar heat induced convection and percolation will cause fluid circulation between generator 1 and thermal wall 13.

Arcuate reflector 10 is dimensioned and positioned relative to the solar target comprised of generator 1 and thermal wall 13 such that all direct radiation received within an acceptance angle of about 58° is reflected to said target. The axis of the accepted radiation pattern is inclined out of the vertical by the latitude angle, and the acceptance half angle is between 25 and 35° (typically 29°). The solid line depiction of thermal wall 13 illustrates its position relative to reflector 10 at a latitude of about 25°, whereas the dashed line depiction 13' illustrates its relative position near the equator.

The advantage of hinging the outer arcuate sections 11 and 12 is illustrated by considering positions 11' and 12', which are the fixed year-round positions of those sections if they were stationary and were also required to have an acceptance half angle of 29°. At the equinox, the outer reflectors are hinged out until the acceptance half angle is only about 15°, e.g., between 10° and 24°. That position is shown by solid line depictions 11 and 12. At the summer equinox their position is at 11' and 12''; thus yielding virtually the same increased aperture as from positions 11 and 12.

The glazing 14 is mounted to the stationary reflector 10 so it is also stationary. One additional advantage of hinged sections 11 and 12 is that they can fold up to envelop and protect glazing 14 plus the target. In order to have reflector 10 the same shape at any latitude, it can be configured as a cylindrical section centered on the center of generator 1 between the extreme latitude positions of the thermal wall, and outside that, an involute. The movable reflectors are preferably half parabolic sections.

Figure 3:
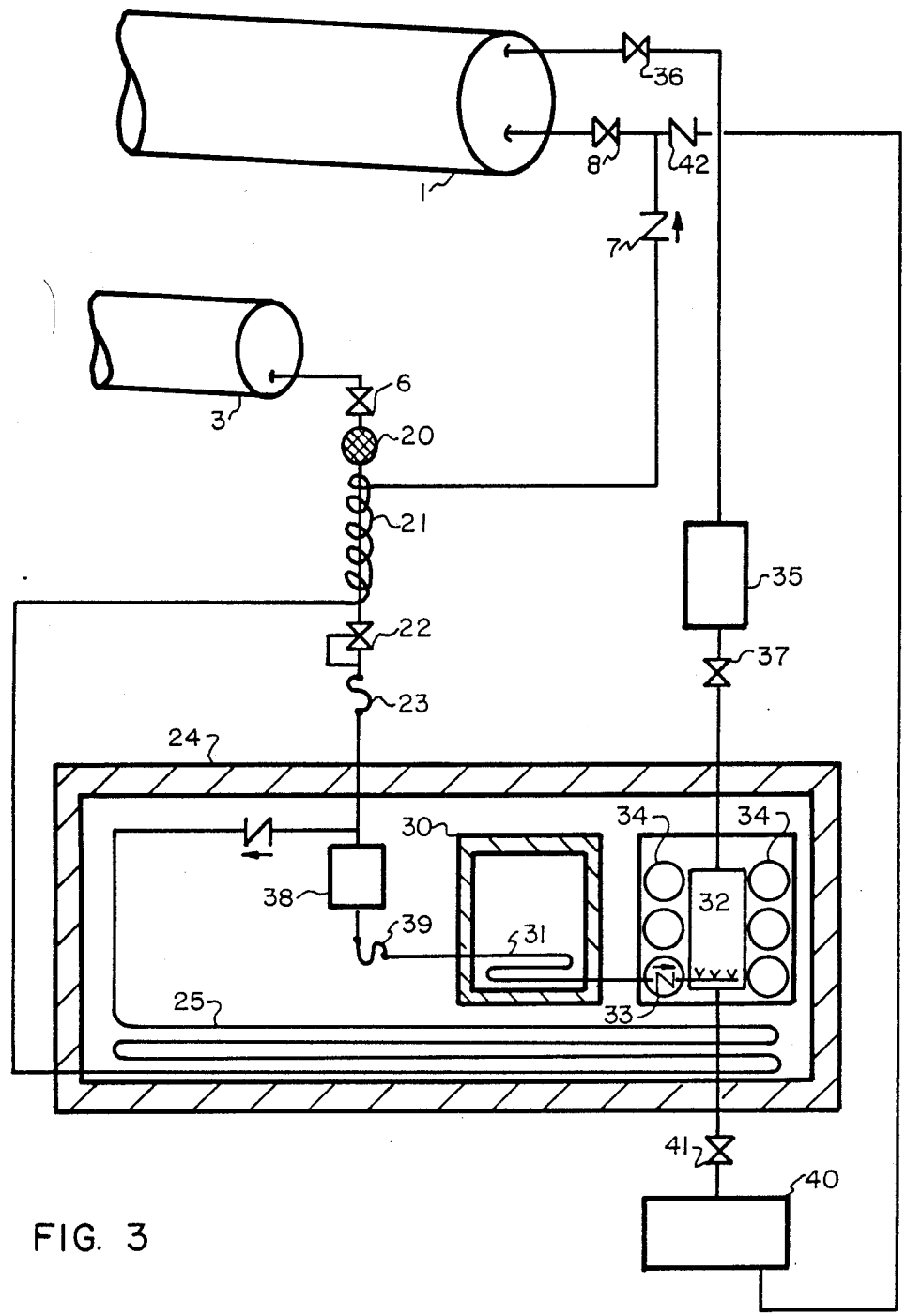
FIG. 3 is a schematic flowsheet which shows the additional components utilized to produce a continuous 100° C. freezer compartment temperature, and their relationship to the components present in the conventional ISAAC cycle.

Referring to FIG. 3, the conventional ISAAC components are generator/absorber 1, receiver 3, refrigerant supply valve 6, strainer 20, regenerative heat exchanger 21, pressure reducing valve 22, capillary 23, cold box 24, evaporator coil 25 and vapor return valves 7 and 8. In order to maintain a continuous −20° C. in freezer compartment 30, it is necessary to add second evaporator 31 and second absorber 32, plus a means for routing vapor from evaporator 31 to absorber 32, preferably inclusive of one-way valve 33. Absorber 32 is cooled by ice 34 which was produced by evaporator 25. Absorber 32 is filled from generator/absorber 1 preferably by use of charge tank 35 and stop valves 36 and 37, only one of which is open at a time. Absorber 32 can only be partially filled initially, as its fluid volume increases as absorption initially, as its fluid volume increases as absorption proceeds. Hence charge tank 35 is dimensioned to provide the correct starting charge level. Alternatively absorber 32 could be charged by a level control valve, or other known means.

Since in some conditions receiver 3 will be emptied through evaporator 25, it is desirable to have a separate supply of liquid refrigerant for evaporator 31. That is the purpose of reservoir 38. Means for pressure reduction 39 (e.g., a capillary) controls the flow rate of liquid refrigerant to evaporator 31 such that the supply lasts as long as necessary, e.g., the daylight hours.

After the absorbent in absorber 32 loses its capacity to absorb refrigerant vapor at the required low pressure, typically every 24 hours, it is emptied and refilled with a fresh charge. Preferably it is drained to a discharge tank 40 by opening stop valve 41. After valve 41 is re-closed, the absorbent in tank 40 slowly heats up to ambient temperature, causing its pressure to increase. When the pressure exceeds that in generator/absorber 1, one-way valve 42 opens and the absorbent transfers uphill back to the generator, thus completing the cycle. The absorbent must be liquid phase to facilitate all these transfers; the preferred refrigerant is ammonia, and the preferred absorbent is water, although many others such as NaSCN, NaI, LiNO$_3$, LiBr, LiCl, and combinations are possible.

I claim:

1. An apparatus for producing refrigeration by an intermittent absorption cycle apparatus comprised of a generator/absorber, a condenser, and an evaporator, wherein the improvement comprises:
   (a) a second absorber which is cooled by refrigeration produced by said evaporator;
   (b) a second evaporator in which liquid refrigerant is evaporated;
   (c) a means for routing evaporated refrigerant from said second evaporator to said second absorber;
   (d) a means for transferring absorbent from said generator/absorber to said second absorber;
   (e) a reservoir of liquid refrigerant for said second evaporator which is not supply liquid to said evaporator;
   (f) a means for reducing the pressure of the liquid refrigerant supplied from said reservoir to said second evaporator; and,
   (g) at least one means for supplying heat to said generator/absorber comprised of a solar radiation collecting apparatus comprised of a stationary arcuate central section having acceptance half angle relative to said generator/absorber of between 25° and 35°; plus two arcuate outer sections which are hinged to said central section so as to be movable to acceptance half angles between 10° and 24° at any time of the year.

2. An apparatus for producing refrigeration by an intermittent absorption cycle apparatus comprised of a generator/absorber, a condenser, and an evaporator, wherein the improvement comprises:
   (a) a refrigeration store which is intermittently cooled by said evaporator, and a second absorber which is cooled by said refrigeration store;
   (b) a second evaporator in which liquid refrigerant is evaporated;
   (c) a means for routing evaporated refrigerant from said second evaporator to said second absorber; and
   (d) a means for transferring absorbent from said generator/absorber to said second absorber.

3. The apparatus according to claim 2 additionally comprised of a reservoir of liquid refrigerant for said second evaporator which is not supply liquid to said evaporator.

4. The apparatus according to claim 3 additionally comprised of a means for reducing the pressure of the liquid refrigerant supplied from said reservoir to said second evaporator; and at least one means for supplying heat to said generator/absorber.

5. The apparatus according to claim 4 wherein at least one of said means for supplying heat is comprised of a solar radiation collecting apparatus comprised of a stationary arcuate central section having acceptance half angle relative to said generator/absorber of between 25° and 35°; plus two arcuate outer sections which are hinged to said central section so as to be movable to acceptance half angles between 10° and 24° at any time of the year.

6. The apparatus according to claim 2 wherein said refrigeration store which is intermittently cooled by said evaporator and which cools said second evaporator is comprised of ice.

7. The apparatus according to claim 2 wherein said refrigerant is ammonia and said absorbent is a liquid phase ammonia absorbent selected from the list comprised of H$_2$O, NaSCN, NaI, LiNO$_3$, LiBr, LiCl, and mixtures thereof.

8. The apparatus according to claim 2 wherein said means for transferring is comprised of a charge tank which is dimensioned to contain the proper amount of absorbent charge for said second absorber; a valve for filling said charge tank from said generator/absorber; and a separate valve for discharging said charge tank to said second absorber.

9. The apparatus according to claim 2 additionally comprised of a discharge tank, a valve for draining absorbent from second absorber to said discharge tank; and a valve and conduit for transferring absorbent from the bottom of said discharge tank back to said generator/absorber.

* * * * *